(12) United States Patent
Iwamura et al.

(10) Patent No.: US 11,849,141 B2
(45) Date of Patent: *Dec. 19, 2023

(54) PREDICTION IMAGE CORRECTING DEVICE, IMAGE ENCODING DEVICE, IMAGE DECODING DEVICE, AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,974

(22) Filed: Feb. 22, 2023

(65) Prior Publication Data

US 2023/0199215 A1 Jun. 22, 2023

Related U.S. Application Data

(63) Continuation of application No. 17/062,306, filed on Oct. 2, 2020, now Pat. No. 11,622,127, which is a
(Continued)

(30) Foreign Application Priority Data

Apr. 4, 2018 (JP) .................................. 2018-072451

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/139* (2014.11); *H04N 19/159* (2014.11); *H04N 19/176* (2014.11)

(58) Field of Classification Search
None
See application file for complete search history.

(56) References Cited

U.S. PATENT DOCUMENTS 10,298,961 B2 5/2019 Rosewarne et al.
10,681,346 B2 6/2020 Iwamura et al.
(Continued)

FOREIGN PATENT DOCUMENTS

CN 106464866 A 2/2017
EP 2 306 733 A1 4/2011
(Continued)

OTHER PUBLICATIONS

Shunsuke Iwamura et al., "Description of SDR and HDR video coding technology proposal by NHK and SHARP", Joint Video Exploration Team (JVET) of ITU-T SG 16 WP 3 and ISO/IEC JTC 1/SC 29/WG 11, JVET-J0027_v1, 10th Meeting: San Diego, US, Apr. 2018, pp. i, 1-10.

(Continued)

*Primary Examiner* — Lindsay J Uhl
(74) *Attorney, Agent, or Firm* — Studebaker & Brackett PC

(57) ABSTRACT

A prediction image correcting device comprises a predictor (108) configured to predict a target image block obtained by dividing a present image frame by using a plurality of reference images to generate a prediction image corresponding to the target image block a prediction accuracy evaluator (109) configured to evaluate prediction accuracy of the prediction image based on a degree of similarity between the plurality of reference images used for generating the prediction image and a corrector (110) configured to perform correction processing on the prediction image by using a decoded neighboring block adjacent to the target image block, wherein the corrector is configured to control the (Continued)

correction processing based at least on an evaluation result of the prediction accuracy evaluator.

10 Claims, 9 Drawing Sheets

Related U.S. Application Data continuation of application No. PCT/JP2019/014364, filed on Mar. 29, 2019.

(51) Int. Cl.
*H04N 19/139* (2014.01)
*H04N 19/159* (2014.01)
*H04N 19/176* (2014.01)

(56) References Cited

U.S. PATENT DOCUMENTS

| | | | |
|---|---|---|---|
| 11,076,149 B2 | 7/2021 | Ichigaya et al. | |
| 2005/0094003 A1 | 5/2005 | Thorell | |
| 2011/0122953 A1 | 5/2011 | Nakagami et al. | |
| 2012/0263237 A1 | 10/2012 | Koyama et al. | |
| 2013/0051467 A1 | 2/2013 | Zhou et al. | |
| 2015/0103904 A1 | 4/2015 | Rapaka et al. | |
| 2017/0127090 A1* | 5/2017 | Rosewarne | H04N 19/86 |
| 2018/0176560 A1* | 6/2018 | Mishurovskiy | H04N 19/167 |
| 2018/0359470 A1 | 12/2018 | Lee et al. | |
| 2019/0132606 A1* | 5/2019 | Su | H04N 19/119 |
| 2020/0260073 A1 | 8/2020 | Iwamura et al. | |
| 2020/0314432 A1 | 10/2020 | Wang et al. | |
| 2021/0021862 A1 | 1/2021 | Iwamura et al. | |
| 2021/0321128 A1 | 10/2021 | Ichigaya et al. | |
| 2022/0224936 A1 | 7/2022 | Iwamura et al. | |

FOREIGN PATENT DOCUMENTS

| | | |
|---|---|---|
| JP | 2000-059785 A | 2/2000 |
| JP | 6895586 B2 | 6/2021 |
| JP | 6910575 B2 | 7/2021 |
| WO | 2005/022919 A1 | 3/2005 |
| WO | 2008/048489 A2 | 4/2008 |
| WO | 2010/010942 A1 | 1/2010 |
| WO | 2011/080807 A1 | 7/2011 |
| WO | 2016/160605 A1 | 10/2016 |
| WO | 2017/030198 A1 | 2/2017 |

OTHER PUBLICATIONS

International Search Report issued in PCT/JP2019/014364; dated Jun. 18, 2019.
Office Action issued in JP 2020-512227; mailed by the Japanese Patent Office dated May 11, 2021.
Office Action issued in JP 2020-512227; mailed by the Japanese Patent Office dated Mar. 30, 2021.

* cited by examiner

PREDICTION IMAGE CORRECTING DEVICE, IMAGE ENCODING DEVICE, IMAGE DECODING DEVICE, AND PROGRAM

RELATED APPLICATIONS

This application is a Continuation of U.S. patent application Ser. No. 17/062,306 filed Oct. 2, 2020, which is a continuation of PCT/JP2019/014364 filed on Mar. 29, 2019, which claims priority to Japanese Application No. 2018-072451 filed on Apr. 4, 2018. The entire contents of these applications are incorporated herein by reference.

TECHNICAL FIELD

The present invention relates to a prediction image correcting device, an image encoding device, an image decoding device, and a program.

BACKGROUND ART

In video encoding technology, efficient encoding (compression) has been realized by performing transform, prediction and the like for each block obtained by dividing a present image frame (picture). There are two prediction methods: intra prediction and inter prediction.

The intra prediction is a method of generating a prediction image by referencing decoded neighboring blocks adjacent to an encoding or decoding target block (hereinafter referred to as a "target image block"). The inter prediction is a method of generating a prediction image by referencing decoded frames different from the present frame to which the target image block belongs.

Patent Literature 1 discloses a prediction image correcting device that predicts a target image block by inter prediction to generate an inter-predicted image and predicts the target image block by intra prediction to generate an intra-predicted image, and performs weighted averaging on the inter-predicted image and the intra-predicted image.

Specifically, the prediction image correcting device disclosed in Patent Literature 1 evaluates the continuity between the inter-predicted image corresponding to the target image block and a decoded neighboring block adjacent to the target image block, and when evaluating that it is discontinuous, corrects an edge region of the inter-predicted image by filter processing using the decoded neighboring block.

CITATION LIST

Patent Literature

Patent Literature 1: Specification of U.S. Patent Application Publication No. 2013/051467

SUMMARY OF INVENTION

The prediction image correcting device disclosed in Patent Literature 1 applies the filter processing according to the evaluation of the continuity between the inter-predicted image and the decoded neighboring block regardless of the prediction accuracy of the inter prediction.

For that reason, in a case such as when there is an object boundary at the boundary between the inter-predicted image and the decoded neighboring block, even when the prediction accuracy at the edge region of the inter-predicted image is high, the filter processing is applied to the edge region, which causes a problem that the accuracy of the prediction image may be lowered due to the filter processing.

Thus, it is an object of the present invention to provide a prediction image correcting device, an image encoding device, an image decoding device, and a program that can correct a prediction image in an appropriate manner.

A prediction image correcting device according to a first feature includes: a predictor configured to predict a target image block obtained by dividing a present image frame by using a plurality of reference images to generate a prediction image corresponding to the target image block; a prediction accuracy evaluator configured to evaluate prediction accuracy of the prediction image based on a degree of similarity between the plurality of reference images used for generating the prediction image; and a corrector configured to perform correction processing on the prediction image by using a decoded neighboring block adjacent to the target image block, wherein the corrector is configured to control the correction processing based at least on an evaluation result of the prediction accuracy evaluator.

Note that the prediction using the plurality of reference images is typified by bi-prediction for inter prediction but is not limited thereto, and a similar technique can also be applied in the case of generating the prediction image by multiple reference, such as the IntraBC mode (intra block copy mode) of images used in the HEVC encoding scheme, for example.

An image encoding device according to a second feature includes the prediction image correcting device according to the first feature.

An image decoding device according to a third feature it includes the prediction image correcting device according to the first feature.

A program according to a fourth feature causes a computer to function as the prediction image correcting device according to the first feature.

According to the present invention, it is possible to provide a prediction image correcting device, an image encoding device, an image decoding device, and a program that can correct a prediction image in an appropriate manner.

DESCRIPTION OF EMBODIMENTS

Figure 1:
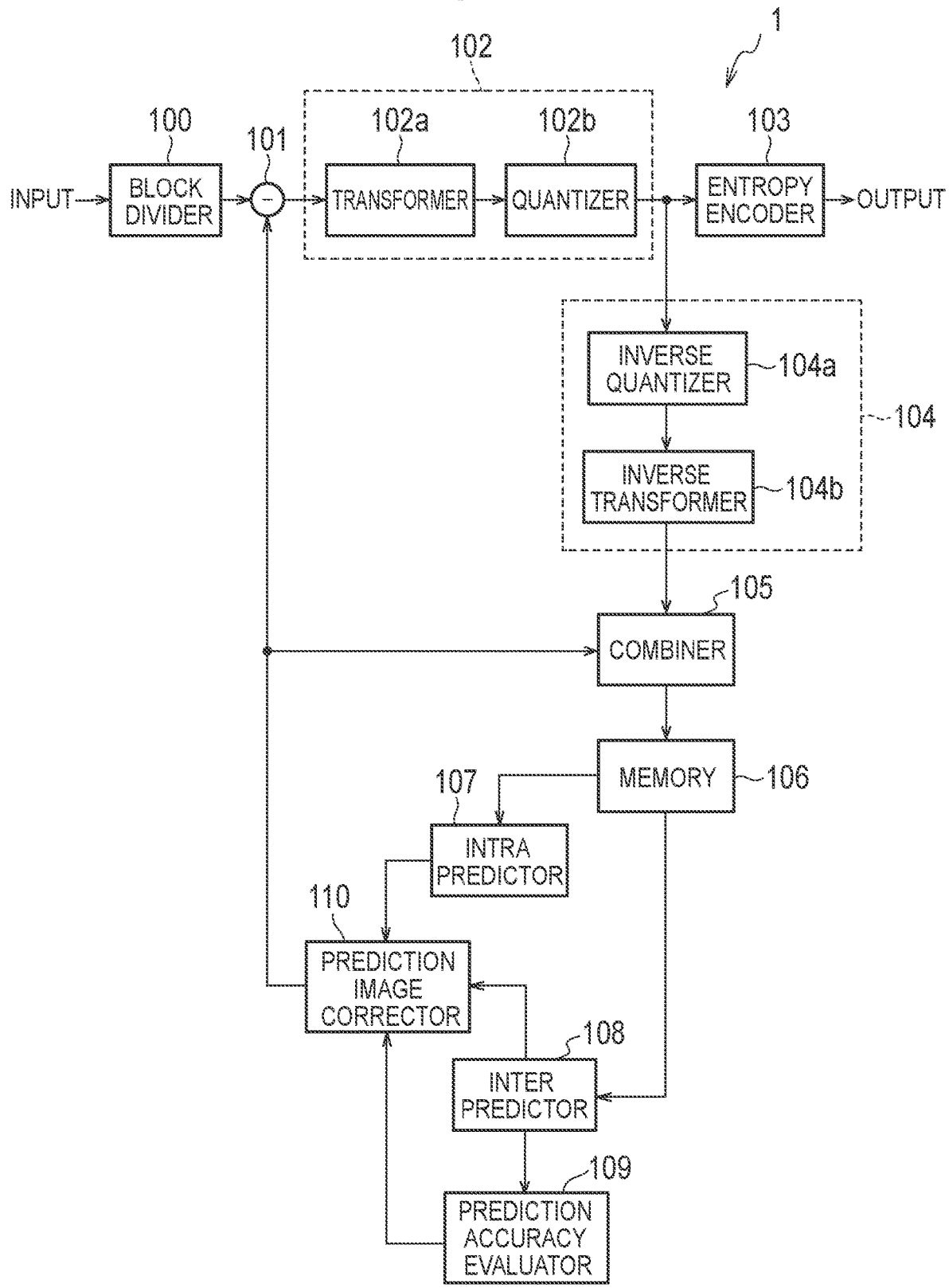
FIG. 1 is a diagram illustrating an arrangement of an image encoding device according to an embodiment.

An image encoding device and an image decoding device according to embodiments will be described with reference to the drawings. The image encoding device and the image decoding device according to the embodiments encode and decode a moving image typified by MPEG. The same or similar reference numerals will be assigned to the same or similar portions in the following description of the drawings.

1. Arrangement of Image Encoding Device

FIG. 1 is a diagram illustrating an arrangement of an image encoding device 1 according to the present embodiment. As illustrated in FIG. 1, the image encoding device 1 includes a block divider 100, a subtractor 101, a transformer 102a, a quantizer 102b, an entropy encoder 103, an inverse quantizer 104a, an inverse transformer 104b, a combiner 105, a memory 106, an intra predictor 107, an inter predictor 108, a prediction accuracy evaluator 109, and a prediction image corrector (corrector) 110. In the present embodiment, the intra predictor 107, the inter predictor 108, the prediction accuracy evaluator 109, and the prediction image corrector 110 constitute a prediction image correcting device.

The block divider 100 divides an input image frame (or picture) into block-like subregions, and outputs the image blocks to the subtractor 101 (and the inter predictor 108). For example, the size of an image block is 32×32 pixels, 16×16 pixels, 8×8 pixels, 4×4 pixels, or the like. The image block is a unit for which the image encoding device 1 performs encoding and the image decoding device 2 performs decoding, and such an image block is referred to as a target image block. Note that the shape of the image block is not limited to a square and may also be a rectangle.

The subtractor 101 calculates a prediction residual indicating the pixel-by-pixel difference between the target image block input from the block divider 100 and a prediction image corresponding to the target image block (a prediction image block). Specifically, the subtractor 101 calculates the prediction residual by subtracting each pixel value of the prediction image from each pixel value of the encoding target block, and outputs the calculated prediction residual to the transformer 102a. In the present embodiment, the prediction image has been corrected by the prediction image corrector 110, which will be described later, and is input to the subtractor 101 from the prediction image corrector 110.

The transformer 102a and the quantizer 102b configure a transformer/quantizer 102 which performs orthogonal transform processing and quantization processing in a block unit.

The transformer 102a performs an orthogonal transform of the prediction residual input from the subtractor 101 to calculate transform coefficients, and outputs the calculated transform coefficients to the quantizer 102b. The orthogonal transform refers to, for example, discrete cosine transform (DCT), discrete sine transform (DST), Karhunen-Loeve transform (KLT), or the like.

The quantizer 102b quantizes the transform coefficients input from the transformer 102a using a quantization parameter (Qp) and a quantization matrix to generate quantized transform coefficients. The quantization parameter (Qp) is a parameter to be applied in common to respective transform coefficients within a block and is a parameter which defines roughness of quantization. The quantization matrix is a matrix having a quantization value upon quantization of the respective transform coefficients as an element. The quantizer 102b outputs quantization control information, the generated quantized transform coefficient information, and the like, to the entropy encoder 103 and the inverse quantizer 104a.

The entropy encoder 103 performs entropy encoding on the quantized transform coefficients input from the quantizer 102b for data compression to generate encoded data (a bit stream), and outputs the encoded data to the outside of the image encoding device 1. The entropy encoding can use Huffman encoding, context-based adaptive binary arithmetic coding (CABAC), and the like. Note that information about prediction is input to the entropy encoder 103 from the intra predictor 107 and the inter predictor 108. The entropy encoder 103 also performs entropy encoding of this information.

The inverse quantizer 104a and the inverse transformer 104b configure an inverse quantizer/inverse transformer 104 which performs inverse quantization processing and inverse orthogonal transform processing in a block unit.

The inverse quantizer 104a performs inverse quantization processing corresponding to the quantization processing performed by the quantizer 102b. Specifically, the inverse quantizer 104a restores the transform coefficients by performing inverse quantization of the quantized transform coefficients input from the quantizer 102b using the quantization parameter (Qp) and the quantization matrix, and outputs the restored transform coefficients to the inverse transformer 104b.

The inverse transformer 104b performs inverse orthogonal transform processing corresponding to the orthogonal transform processing performed by the transformer 102a. For example, in a case where the transformer 102a performs discrete cosine transform, the inverse transformer 104b performs inverse discrete cosine transform. The inverse transformer 104b restores the prediction residual by performing an inverse orthogonal transform of the transform coefficients input from the inverse quantizer 104a and outputs the restored prediction residual to the combiner 105.

The combiner 105 combines the restored prediction residual input from the inverse transformer 104b with the prediction image input from the prediction image corrector 110 on a pixel-by-pixel basis. The combiner 105 reconstructs (decodes) the target image block by adding each pixel value of the restored prediction residual and each pixel value of the prediction image, and outputs a reconstruction image block, which is the reconstructed target image block, to the memory 106. Note that the reconstruction image block may be referred to as a decoded block.

The memory 106 stores the reconstruction image block input from the combiner 105. The memory 106 stores the reconstruction image block on a frame-by-frame basis.

The intra predictor 107 generates an intra-predicted image by referencing a decoded neighboring block that is adjacent to the target image block out of reconstruction image blocks (decoded blocks) stored in the memory 106. The intra predictor 107 selects an optimum intra prediction mode and performs intra prediction by using the selected intra prediction mode. A plurality of intra prediction modes corresponding to a plurality of intra prediction directions are prescribed. When a target pixel in the target image block is to be predicted by referencing a neighboring pixel adjacent to the target image block, the intra prediction direction refers to the direction of the neighboring reference pixel with respect to the target pixel. That is, the intra prediction mode (intra prediction direction) determines a neighboring reference pixel to be used for predicting each pixel in the target image block. The intra predictor 107 outputs the intra-predicted image (and/or neighboring reference pixel) to the prediction image corrector 110, as well as outputting information of the selected intra prediction mode to the entropy encoder 103.

The inter predictor 108 performs inter prediction for predicting the target image block by using a reconstruction image (decoded image) frame stored in the memory 106 as a reference image. Specifically, the inter predictor 108 calculates motion vectors by using a technique such as block matching, and generates an inter-predicted image based on the motion vectors. The inter predictor 108 selects an optimum inter prediction method from inter prediction using a plurality of reference images (typically, bi-prediction) and inter prediction using a single reference image (unidirectional prediction), and performs the inter prediction by using the selected inter prediction method. In the present embodiment, description will be made mainly for a case where the inter predictor 108 uses the bi-prediction will be mainly described, and the inter predictor 108 corresponds to a predictor that performs prediction by using a plurality of reference images. The inter predictor 108 outputs the generated inter-predicted image to the prediction image corrector 110, as well as outputting information about the selected inter prediction method and the motion vectors to the entropy encoder 103. The inter predictor 108 also outputs the plurality of reference images used for the inter prediction to the prediction accuracy evaluator 109.

The prediction accuracy evaluator 109 evaluates prediction accuracy at an edge region of the inter-predicted image based on the degree of similarity between the plurality of reference images used for generating the inter-predicted image. Specifically, if the inter predictor 108 performs the inter prediction by using a plurality of reference images, the degree of similarity between the plurality of reference images used for the inter prediction is calculated for each image portion consisting of one or more pixels, the prediction accuracy of the inter-predicted image is evaluated for each image portion based on the degree of similarity, and information of the evaluation result is output to the prediction image corrector 110. In the present embodiment, description will be made mainly for an example where the prediction accuracy evaluator 109 calculates the degree of similarity between the plurality of reference images used for the prediction on a pixel-by-pixel basis and evaluates the prediction accuracy of the inter-predicted image on a pixel-by-pixel basis. The details of the prediction accuracy evaluator 109 will be described later.

The prediction image corrector 110 corrects the inter-predicted image input from the inter predictor 108 and the intra-predicted image input from the intra predictor 107 by performing weighted averaging on them. Specifically, the prediction image corrector 110 corrects the edge region of the inter-predicted image by filter processing by using the decoded neighboring block (neighboring reference pixel) corresponding to the intra-predicted image. The prediction image corrector 110 also controls the filter processing based at least on the evaluation result of the prediction accuracy evaluator 109. To "control the filter processing" includes controlling whether to perform the filter processing and controlling filter intensity. In the present embodiment, description will be made mainly for an example where the prediction image corrector 110 controls whether to perform the filter processing based at least on the evaluation result of the prediction accuracy evaluator 109. For example, the prediction image corrector 110 performs the filter processing when the prediction accuracy evaluated by the prediction accuracy evaluator 109 is less than or equal to a first threshold and does not perform the filter processing when the prediction accuracy evaluated by the prediction accuracy evaluator 109 exceeds the first threshold. The prediction image corrector 110 outputs the filter-processed inter-predicted image to the subtractor 101 and the combiner 105 as the prediction image when the filter processing is performed, and outputs the inter-predicted image, as it is, to the subtractor 101 and the combiner 105 as the prediction image when the filter processing is not performed. Note that the "prediction accuracy" may be represented by "prediction inaccuracy". With regard to the "prediction inaccuracy", that the prediction accuracy is less than or equal to the first threshold may mean that the prediction inaccuracy is high, for example. That the prediction accuracy exceeds the first threshold may mean that the prediction inaccuracy is low. The details of the prediction image corrector 110 will be described later.

2. Arrangement of Image Decoding Device

Figure 2:
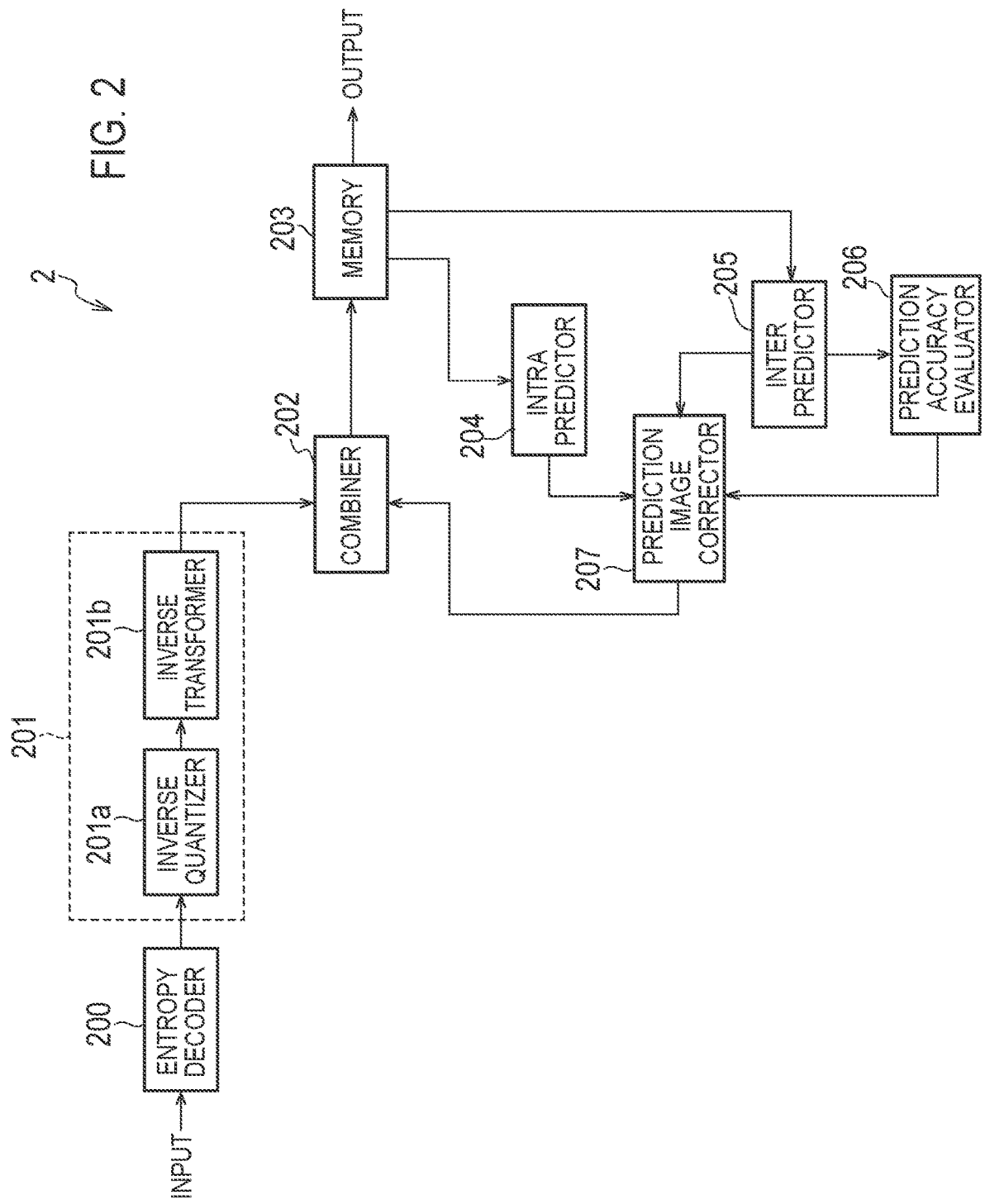
FIG. 2 is a diagram illustrating an arrangement of an image decoding device according to the embodiment.

FIG. 2 is a diagram illustrating an arrangement of an image decoding device 2 according to the present embodiment. As illustrated in FIG. 2, the image decoding device 2 includes an entropy decoder 200, an inverse quantizer 201a, an inverse transformer 201b, a combiner 202, a memory 203, an intra predictor 204, an inter predictor 205, a prediction accuracy evaluator 206, and a prediction image corrector 207. In the present embodiment, the intra predictor 204, the inter predictor 205, the prediction accuracy evaluator 206, and the prediction image corrector 207 constitute a prediction image correcting device.

The entropy decoder 200 decodes the encoded data generated by the encoding device 1, and outputs the quantized transform coefficients to the inverse quantizer 201a. Also, the entropy decoder 200 decodes the encoded data, acquires the information about the prediction (intra prediction and inter prediction), and outputs the information about the prediction to the intra predictor 204 and the inter predictor 205.

The inverse quantizer 201a and the inverse transformer 201b configure an inverse quantizer/inverse transformer 201 which performs inverse quantization processing and inverse orthogonal transform processing in a block unit.

The inverse quantizer 201a performs inverse quantization processing corresponding to the quantization processing performed by the quantizer 102b of the image encoding device 1. The inverse quantizer 201a restores the transform coefficients by performing inverse quantization of the quantized transform coefficients input from the entropy decoder 200 by using the quantization parameter (Qp) and the quantization matrix, and outputs the restored transform coefficients to the inverse transformer 201b.

The inverse transformer 201b performs inverse orthogonal transform processing corresponding to the orthogonal transform processing performed by the transformer 102a of the image encoding device 1. The inverse transformer 201b restores the prediction residual by performing an inverse orthogonal transform of the transform coefficients input from the inverse quantizer 201a and outputs the restored prediction residual to the combiner 202.

The combiner 202 reconstructs (decodes) the original target image block by combining the prediction residual input from the inverse transformer 201b and the prediction image input from the prediction image corrector 207 on a pixel-by-pixel basis, and outputs the reconstruction image block to the memory 203.

The memory 203 stores the reconstruction image block input from the combiner 202. The memory 203 stores the reconstruction image block on a frame-by-frame basis. The memory 203 outputs the reconstruction image (decoded image) frames to the outside of the image decoding device 2 in the display order.

The intra predictor 204 generates an intra-predicted image by referencing the reconstruction image block stored in the memory 203 and performing intra prediction according to the intra prediction information (intra prediction mode) input from the entropy decoder 200. Specifically, the intra predictor 204 generates the intra-predicted image by referencing a neighboring reference pixel that is determined according to the intra prediction mode out of reconstruction image blocks (decoded blocks) stored in the memory 203. The intra predictor 204 outputs the intra-predicted image (and/or neighboring reference pixel) to the prediction image corrector 207.

The inter predictor 205 performs inter prediction for predicting the target image block by using a reconstruction image (decoded image) frame stored in the memory 106 as a reference image. The inter predictor 205 generates an inter-predicted image by performing the inter prediction according to the inter prediction information (motion vector information or the like) input from the entropy decoder 200, and outputs the inter-predicted image to the prediction image corrector 207. The inter predictor 205 also outputs a plurality of reference images used for the inter prediction to the prediction accuracy evaluator 206.

The prediction accuracy evaluator 206 performs an operation similar to that of the prediction accuracy evaluator 109 of the image encoding device 1. If the inter predictor 205 performs the inter prediction by using a plurality of reference images, the prediction accuracy evaluator 206 evaluates the prediction accuracy of the prediction image on a pixel-by-pixel basis by calculating the degree of similarity between the plurality of reference images on a pixel-by-pixel basis, and outputs information of the evaluation result to the prediction image corrector 207.

The prediction image corrector 207 performs an operation similar to that of the prediction image corrector 110 of the image encoding device 1. The prediction image corrector 207 corrects the edge region of the inter-predicted image by filter processing by using the decoded neighboring block (neighboring reference pixel) corresponding to the intra-predicted image. The prediction image corrector 207 performs the filter processing when the prediction accuracy evaluated by the prediction accuracy evaluator 206 is less than or equal to a first threshold and does not perform the filter processing when the prediction accuracy evaluated by the prediction accuracy evaluator 206 exceeds the first threshold. The prediction image corrector 207 outputs the filter-processed inter-predicted image to the combiner 202 as the prediction image when the filter processing is performed, and outputs the inter-predicted image, as it is, to the combiner 202 as the prediction image when the filter processing is not performed. The details of the prediction image corrector 207 will be described later.

3. Inter Prediction

Figure 3:
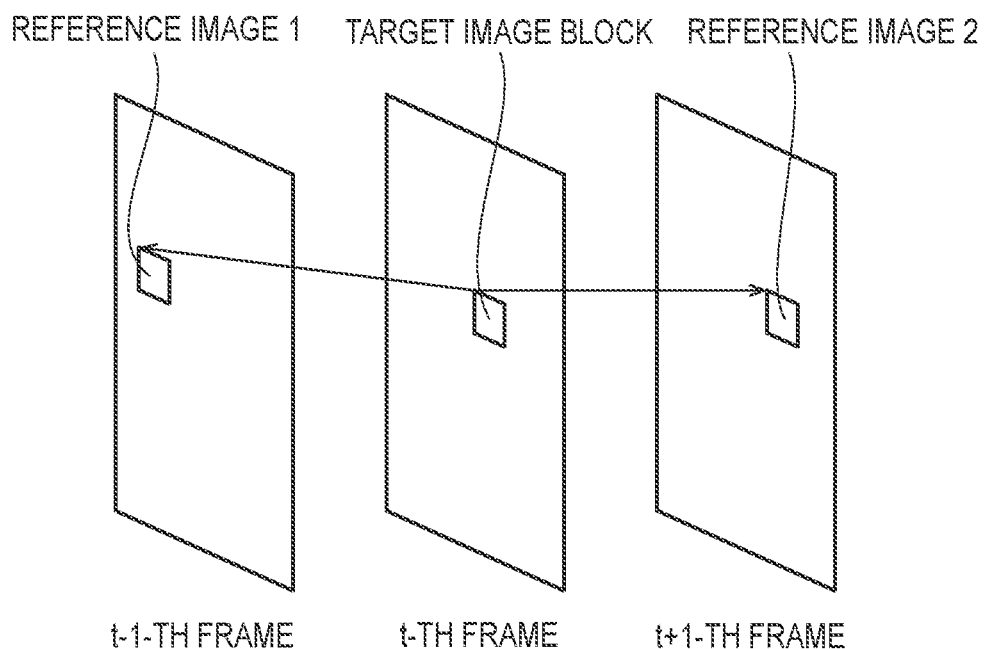
FIG. 3 is a diagram illustrating an example of inter prediction.
Figure 4:
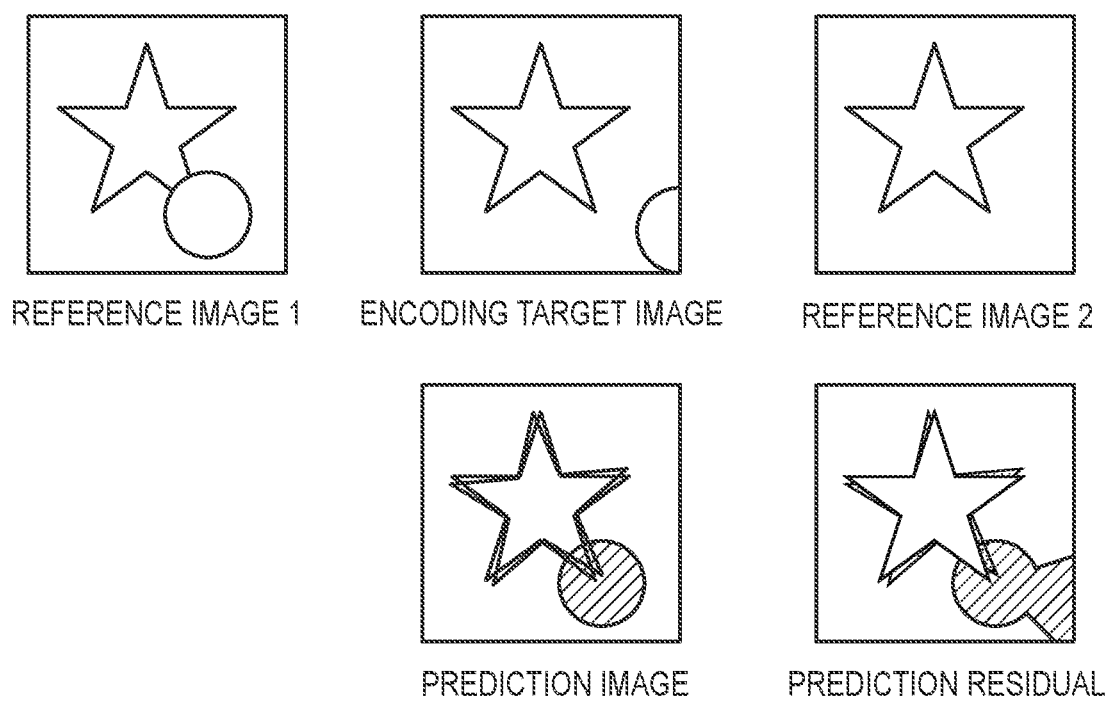
FIG. 4 is a diagram illustrating an example of a prediction image generated by the inter prediction.

FIG. 3 is a diagram illustrating an example of inter prediction. FIG. 4 is a diagram illustrating an example of a prediction image generated by the inter prediction. As a simple example of inter prediction, the use of bi-prediction, in particular forward and backward prediction (bi-directional prediction), used in HEVC will be described.

As illustrated in FIG. 3, in the bi-prediction, frames that are temporally prior and posterior to the target frame (present frame) are referenced. In the example of FIG. 3, a block in the t-th image frame is predicted by referencing the (t−1)-th frame and the (t+1)-th frame. Motion detection is to detect, from within a search range set by the system, portions (blocks) having similarity with the target image block in the (t−1)-th and (t+1)-th reference frames.

The detected portions are reference images. Information indicating relative positions of the reference images with respect to the target image block indicated with an arrow in the drawing, will be referred to as a motion vector. Information of the motion vector is entropy encoded along with the frame information of the reference images at the image encoding device 1. Meanwhile, the image decoding device 2 detects the reference images based on the information of the motion vector generated by the image encoding device 1.

As illustrated in FIG. 3 and FIG. 4, reference images 1 and 2 detected by the motion detection are similar partial images aligned with the target image block within the referenced frames, and thus are images having similarity with the target image block (encoding target image). In the example of FIG. 4, the target image block contains a star design and a partial circle design. The reference image 1 contains a star design and an entire circle design. The reference image 2 contains a star design but does not contain a circle design.

A prediction image is generated from the reference images 1 and 2. Note that, in general, prediction processing involves averaging the reference images 1 and 2 having different features but partially having similarity to generate a prediction image having the features of the individual reference images. However, the prediction image may also be generated by combinedly using more advanced processing, e.g., signal enhancement processing such as by a low-pass filter or a high-pass filter. Here, since the reference image 1 contains the circle design and the reference image 2 does not contain the circle design, if the prediction image is generated by averaging the reference images 1 and 2, the circle design in the prediction image would have half-reduced signals as compared to the reference image 1.

A difference between the prediction image obtained from the reference images 1 and 2 and the target image block (encoding target image) is the prediction residual. The prediction residual indicated in FIG. 4 indicates that a large difference exists only at a portion where edges of the stars in the designs are misaligned and at a portion where the circles in the designs are misaligned (shaded portions), and prediction is performed with high accuracy and has less differences at other portions (a difference does not exist in the example in FIG. 4).

A difference does not exist (at a portion which does not correspond to edges of the stars in the designs and at a background portion) at portions where a degree of similarity between the reference image 1 and the reference image 2 is high, and where prediction is performed with high accuracy. Meanwhile, a large difference exists at portions unique to the respective reference images, that is, at portions where the degree of similarity between the reference image 1 and the reference image 2 is significantly low. Thus, it can be known that prediction accuracy is low and a large difference (residual) exists at portions where the degree of similarity between the reference image 1 and the reference image 2 is significantly low.

If the transform coefficients degrade due to the prediction residual including a portion with a large difference and a portion with no difference being orthogonally transformed and quantized, such degradation of the transform coefficients propagates to the whole of the image (block) through inverse quantization and inverse orthogonal transform. Then, if the target image block is reconstructed by combining the prediction residual (restored prediction residual) restored by inverse quantization and inverse orthogonal transform with the prediction image, degradation of image quality also propagates to portions where prediction has been performed with high accuracy such as a portion which does not correspond to the edges of the stars in the designs and the background portion illustrated in FIG. 4.

4. Prediction Accuracy Evaluator

Figure 5:
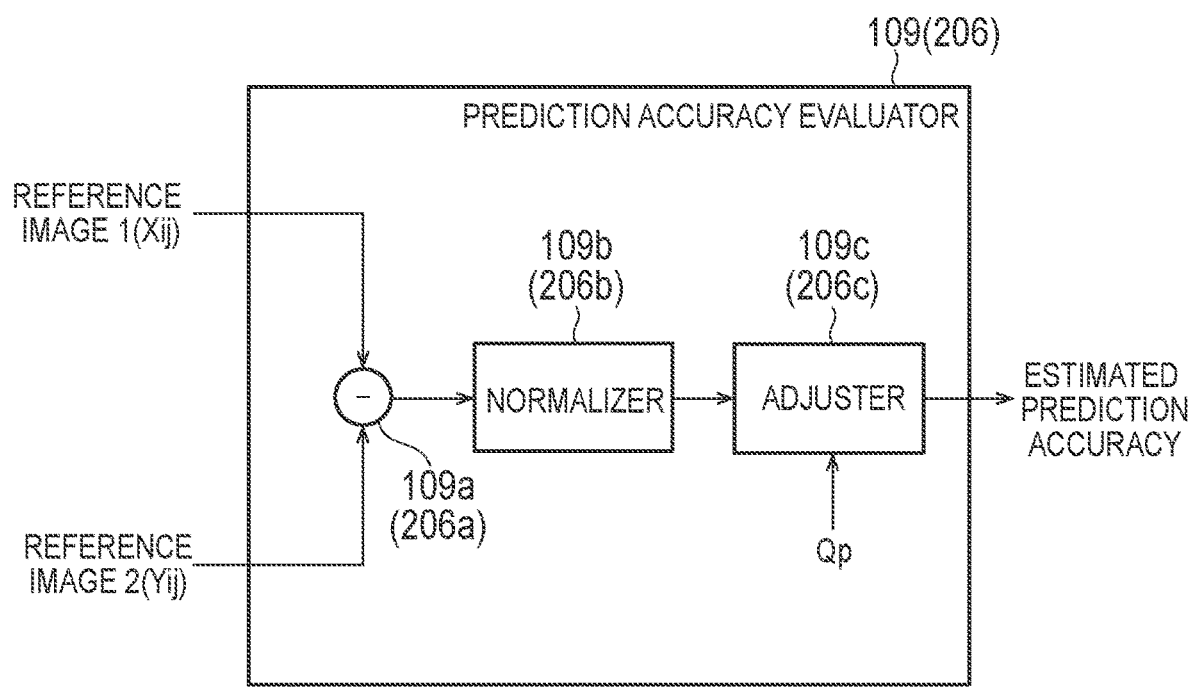
FIG. 5 is a diagram illustrating an example arrangement of a prediction accuracy evaluator according to the embodiment.

FIG. 5 is a diagram illustrating an example arrangement of the prediction accuracy evaluator 109 in the image encoding device 1. The prediction accuracy evaluator 109 evaluates the prediction accuracy of the prediction image on a pixel-by-pixel basis by calculating the degree of similarity between the plurality of reference images used for inter prediction on a pixel-by-pixel basis. Although an example where the prediction accuracy evaluator 109 performs the prediction accuracy evaluation for all pixels of the prediction image will be described here, the prediction accuracy evaluator 109 may not necessarily perform the prediction accuracy evaluation for all pixels of the prediction image. The prediction accuracy evaluator 109 may perform the prediction accuracy evaluation at least for pixels of the edge region of the prediction image.

As illustrated in FIG. 5, the prediction accuracy evaluator 109 includes a difference calculator (subtractor) 109a, a normalizer 109b, and an adjuster 109c.

The difference calculator 109a calculates the absolute difference values between the reference image 1 and the reference image 2 on a pixel-by-pixel basis, and outputs the calculated absolute difference values to the normalizer 109b. The absolute difference values are an example of values indicating the degree of similarity. It can be regarded that the degree of similarity is higher when the absolute difference values are smaller, and the degree of similarity is lower when the absolute difference values are larger. The difference calculator 109a may calculate the absolute difference values after performing filter processing on each reference image. The difference calculator 109a may calculate statistics such as a squared error to use the statistics as the degree of similarity.

The normalizer 109b normalizes the difference values of the individual pixels input from the difference calculator 109a by the absolute difference value of the pixel with the largest absolute difference value in the block (i.e., the maximum value of the absolute difference values in the block), and outputs normalized difference values, which are the normalized absolute difference values, to the adjuster 109c. In the present embodiment, the normalized difference values are used as weights for weighting each pixel of the restored prediction residual combined with the prediction image in the combiner 105.

The adjuster 109c adjusts the normalized difference values (weights) input from the normalizer 109b based on the quantization parameter (Qp), which defines the coarseness of quantization, and outputs these weights. Since the degree of degradation of the restored prediction residual increases as the coarseness of quantization increases, by adjusting the normalized difference values (weights) based on the quantization parameter (Qp), the adjuster 109c can perform weighting of the restored prediction residual by taking the degree of degradation into consideration.

An estimated prediction accuracy Rij of each pixel (ij) output by the prediction accuracy evaluator 109 can be expressed by the following equation (1), for example.

$$Rij = 1 - (\text{abs}(Xij - Yij)/\text{maxD} \times \text{Scale}(Qp)) \quad (1)$$

In the equation (1), Xij is the pixel value of a pixel ij in the reference image 1, Yij is the pixel value of a pixel ij in the reference image 2, and abs is a function for obtaining the absolute value.

Also, in the equation (1), maxD is the maximum value of the difference values abs(Xij−Yij) in the block. Although it is required to obtain the difference values of all pixels in the block to obtain maxD, in order to omit this processing, the maximum value in a neighboring block on which the processing has already been done or the like may instead be used, and the normalization of maxD may be performed by clipping at the used maximum value when there is a value greater than or equal to that value, for example. Alternatively, a table defining the correspondence between the quantization parameter (Qp) and maxD may be used to obtain maxD from the quantization parameter (Qp). Alternatively, a fixed value prescribed by the specifications may be used as maxD.

Further, in expression (1), Scale(Qp) is a coefficient to be multiplied in accordance with the quantization parameter (Qp). Scale(Qp) is designed so as to approach 1.0 in a case where Qp is greater and approach 0 in a case where Qp is smaller, and a degree of approach is adjusted by a system. Alternatively, it is also possible to use a fixed value defined in specifications in advance as Scale(Qp). Further, to simplify the processing, it is also possible to set a fixed value such as 1.0 designed in accordance with the system as Scale(QP).

The adjuster 109c outputs the estimated prediction accuracy Rij. Also, as Rij, the assignment of weights adjusted by a sensitivity function designed according to the system may be output. For example, the sensitivity may be adjusted by providing an offset according to control information such as QP, that is, for example, assuming abs(Xij−Yij)/maxD× Scale(Qp)=Rij, not only Rij=Clip(rij, 1.0, 0.0) but also Rij=Clip(rij+offset, 1.0, 0.0). Note that Clip(x, max, min) indicates a process of clipping at max if x exceeds max and at min if x is below min.

The estimated prediction accuracy Rij calculated in this manner takes a value within a range from 0 to 1.0. Basically, the estimated prediction accuracy Rij approaches 0 when the absolute difference value between the reference images at the pixel ij is larger (that is, the prediction accuracy is lower) and approaches 1 when the absolute difference value between the reference images at the pixel ij is smaller (that is, the prediction accuracy is higher). The prediction accuracy evaluator 109 outputs map information consisting of the estimated prediction accuracies Rij of the individual pixels ij in the block to the prediction image corrector 110 for each block.

Note that the prediction accuracy evaluator 109 may perform the evaluation (calculation of the estimated prediction accuracy Rij) only when the inter prediction using a plurality of reference images is applied, and may not perform the evaluation in other modes, for example, in unidirectional prediction and intra prediction processing without using a plurality of reference images.

Although the prediction accuracy evaluator 109 in the image encoding device 1 has been described, the prediction accuracy evaluator 206 in the image decoding device 2 is configured in a manner similar to the prediction accuracy evaluator 109 in the image encoding device 1. Specifically, the prediction accuracy evaluator 206 in the image decoding device 2 includes a difference calculator 206a, a normalizer 206b, and an adjuster 206c.

5. Prediction Image Corrector

Figure 6:
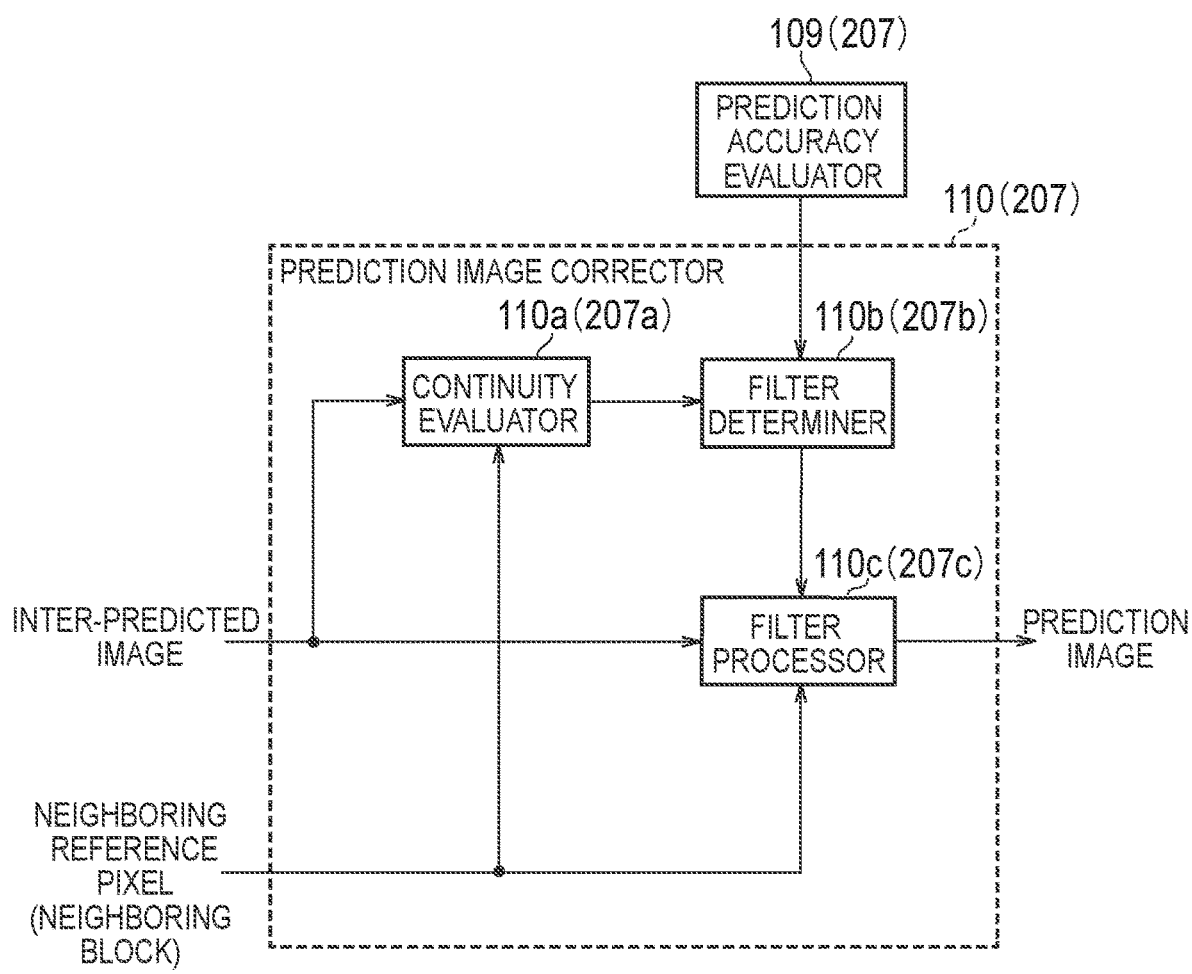
FIG. 6 is a diagram illustrating an example arrangement of a prediction image corrector according to the embodiment.

FIG. 6 is a diagram illustrating an example arrangement of the prediction image corrector 110 in the image encoding device 1. As illustrated in FIG. 6, the prediction image corrector 110 includes a continuity evaluator 110a, a filter determiner 110b, and a filter processor 110c.

The continuity evaluator 110a evaluates the continuity between the inter-predicted image input from the inter predictor 108 and the decoded neighboring block input from the intra predictor 107. The decoded neighboring block is a decoded block adjacent to the target image block. The continuity evaluator 110a outputs the evaluation result of the continuity between the inter-predicted image and the decoded neighboring block to the filter determiner 110b.

Figure 7:
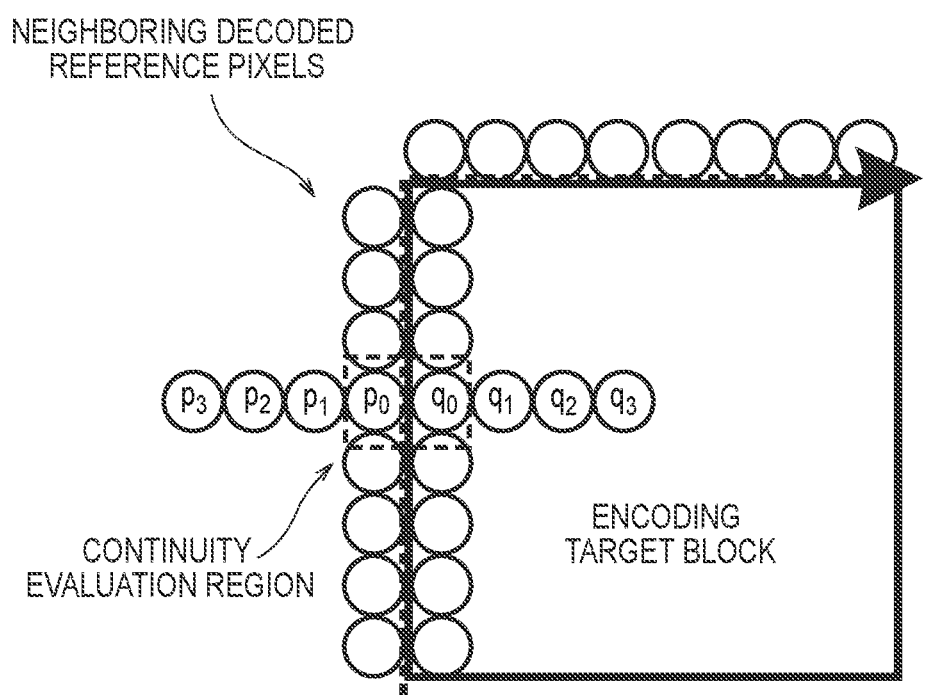
FIG. 7 is a diagram illustrating an example operation of a continuity evaluator according to the embodiment.

FIG. 7 is a diagram illustrating an example operation of the continuity evaluator 110a. In the example of FIG. 7, it is assumed that there are decoded blocks on the left and upper sides of the encoding target image block. The continuity evaluator 110a performs continuity evaluation with respect to the block boundary between the inter-predicted image (target image block) and the decoded blocks in the order from the upper side to the lower side (or from the lower side to the upper side) on a pixel-by-pixel basis. For example, the continuity evaluator 110a calculates a continuity Cont at the block boundary between pixels p0 and q0 in FIG. 7 from the following equation (2).

$$\text{Cont} = |p_2 - 2 \times p_1 + p_0| + |q_2 - 2 \times q_1 + q_0| \quad (2)$$

Note that the unit and evaluation index for the continuity evaluation are not limited to those in the equation (2) and can be replaced with another unit and evaluation index as long as they are prescribed by the system. For example, the unit for the continuity evaluation may be a side of the block boundary (continuity evaluation for the left boundary and continuity evaluation for the upper boundary are performed), and a pixel value difference (abs(p0−q0)) across the boundary may be used as the evaluation index for the continuity evaluation in order to simplify the processing.

The filter determiner 110b determines whether to perform filter processing based on the prediction accuracy evaluation result input from the prediction accuracy evaluator 109 and the continuity evaluation result input from the continuity evaluator 110a. The filter determiner 110b may perform the determination for each pixel of the block boundary between the inter-predicted image and the decoded blocks, or may perform the determination for each side of the block boundary. The filter determiner 110b may determine to change filter intensity (e.g., the number of taps and frequency response of the filter) based on the prediction accuracy evaluation result and the continuity evaluation result. Note that, if the prediction accuracy evaluator 109 performs the prediction accuracy evaluation on a pixel-by-pixel basis, the filter determiner 110b may use an average value of estimated prediction accuracies R of the individual pixels of the edge region (target region of the filter processing) of the inter-predicted image as the prediction accuracy evaluation result.

The filter determiner 110b determines to perform the filter processing when the prediction accuracy evaluated by the prediction accuracy evaluator 109 is less than or equal to a first threshold α and the continuity evaluated by the continuity evaluator 110a is less than or equal to a second threshold β. On the other hand, the filter determiner 110b determines not to perform the filter processing when the prediction accuracy evaluated by the prediction accuracy evaluator 109 exceeds the first threshold α and/or the continuity evaluated by the continuity evaluator 110a exceeds the second threshold β. Here, as the thresholds α and β, values fixed in the system may be set or values variable by a function using the quantization parameter (Qp) may be calculated and set. Also, if the estimated prediction accuracies R are not normalized, a value variable by a function using the maximum value of the estimated prediction accuracies in the target image block may be calculated and set as the threshold α.

When the filter determiner 110b determines to perform the filter processing, the filter processor 110c performs the filter processing on the edge region of the inter-predicted image. As illustrated in FIG. 7, the filter processor 110c performs correction based on the following equation (3) by using prediction pixels q0, q1, and q2 included in the edge region of the inter-predicted image (encoding target block) and neighboring decoded reference pixels p0, p1, and p2 input from the intra predictor 107, and outputs corrected prediction pixels q'0, q'1, and q'2.

[Math. 1]

$$q'_0 = \text{Clip3}(q_0 - 2 \times tc, q_0 + 2 \times tc, (p_1 + 2 \times p_0 + 2 \times q_0 + 2 \times q_1 + q_2 + 4) >> 2)$$

$$q'_1 = \text{Clip3}(q_1 - 2 \times tc, q_1 + 2 \times tc, (p_0 + q_0 + q_1 + q_2 + 2) >> 2)$$

$$q'_2 = \text{Clip3}(q_2 - 2 \times tc, q_2 + 2 \times tc, (p_0 + q_0 + q_1 + 3 \times q_2 + 2 \times q_3 + 4) >> 3) \quad (3)$$

Here, clip(x, max, min) indicates a process of clipping at max if x exceeds max and at min if x is below min. Also, tc in the equation (3) is an adjustment offset for the process used for the clipping, and a value variable by a function using the quantization parameter (Qp) can be calculated and set.

Note that, although the prediction image corrector 110 in the image encoding device 1 has been described, the prediction image corrector 207 in the image decoding device 2 is configured in a manner similar to the prediction image corrector 110 in the image encoding device 1. Specifically, the prediction image corrector 207 in the image decoding device 2 includes a continuity evaluator 207a, a filter determiner 207b, and a filter processor 207c.

6. Prediction Image Correcting Operation

Figure 8:
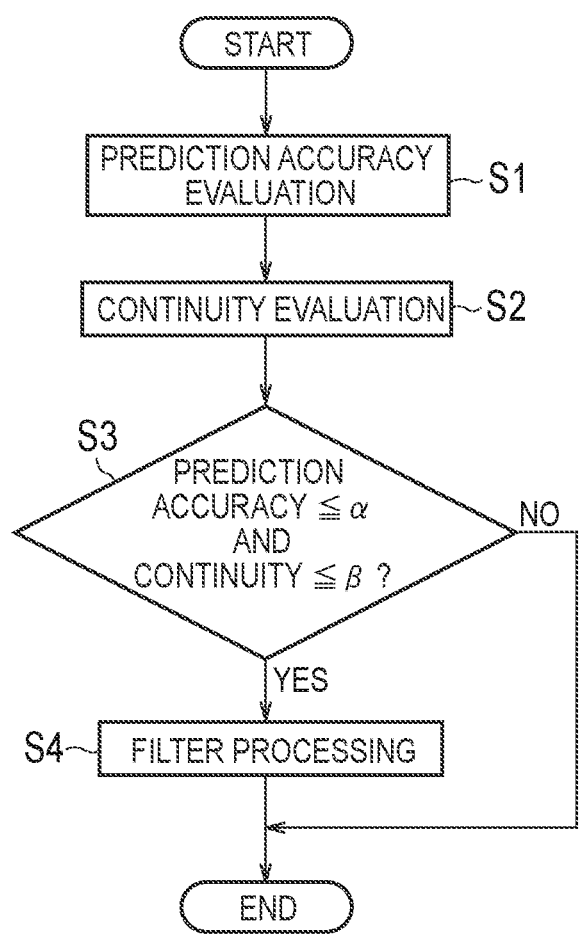
FIG. 8 is a diagram illustrating an example of a prediction image correcting operation according to the embodiment.

FIG. 8 is a diagram illustrating an example of a prediction image correcting operation. Although the prediction image correcting operation in the image encoding device 1 will be described here, a similar prediction image correcting operation is performed in the image decoding device 2. The operation flow in FIG. 8 may be performed for each pixel of the block boundary between the inter-predicted image and the decoded blocks.

As illustrated in FIG. 8, in step S1, the prediction accuracy evaluator 109 evaluates the prediction accuracy at the edge region of the inter-predicted image based on the degree of similarity between the plurality of reference images used by the inter predictor 108 for generating the inter-predicted image.

In step S2, the continuity evaluator 110a evaluates the continuity between the inter-predicted image output by the inter predictor 108 and the decoded neighboring block adjacent to the inter-predicted image.

In step S3, the filter determiner 110*b* compares the prediction accuracy evaluated by the prediction accuracy evaluator 109 with the first threshold α and compares the continuity evaluated by the continuity evaluator 110*a* with the second threshold β.

When the prediction accuracy is less than or equal to the first threshold α and the continuity is less than or equal to the second threshold β (step S3: YES), the filter determiner 110*b* determines to perform the filter processing. In this case, in step S4, the filter processor 110*c* corrects the edge region of the inter-predicted image by filter processing by using the decoded neighboring block (neighboring reference pixel).

On the other hand, when the prediction accuracy exceeds the first threshold α and/or the continuity exceeds the second threshold β (step S3: NO), the filter determiner 110*b* determines not to perform the filter processing. In this case, the filter processor 110*c* does not perform the filter processing.

7. Summary of Embodiment

The image encoding device 1 and the image decoding device 2 according to the present embodiment control the filter processing based on the evaluation result of the prediction accuracy of the inter prediction. In this manner, when the prediction accuracy at the edge region of the inter-predicted image is high, the filter processing can be controlled not to be applied to the edge region, and this can prevent the lowering of the accuracy of the prediction image due to the filter processing. In other words, the filter processing can be applied to the edge region only when the prediction accuracy at the edge region of the inter-predicted image is low, and it is thus possible to perform the filter processing in an appropriate manner.

Also, in the present embodiment, whether to apply the filter processing is determined by operations common to the image encoding device 1 and the image decoding device 2. Specifically, the evaluation of the prediction accuracy of the inter prediction is performed in each of the image encoding device 1 and the image decoding device 2, and whether to apply the filter processing is determined based on the evaluation result. In this manner, it is not necessary to transmit a flag indicating whether to apply the filter processing from the image encoding device 1 to the image decoding device 2, and this can prevent the increase in code amount due to the flag.

8. Modification 1 of Embodiment

Figure 9:
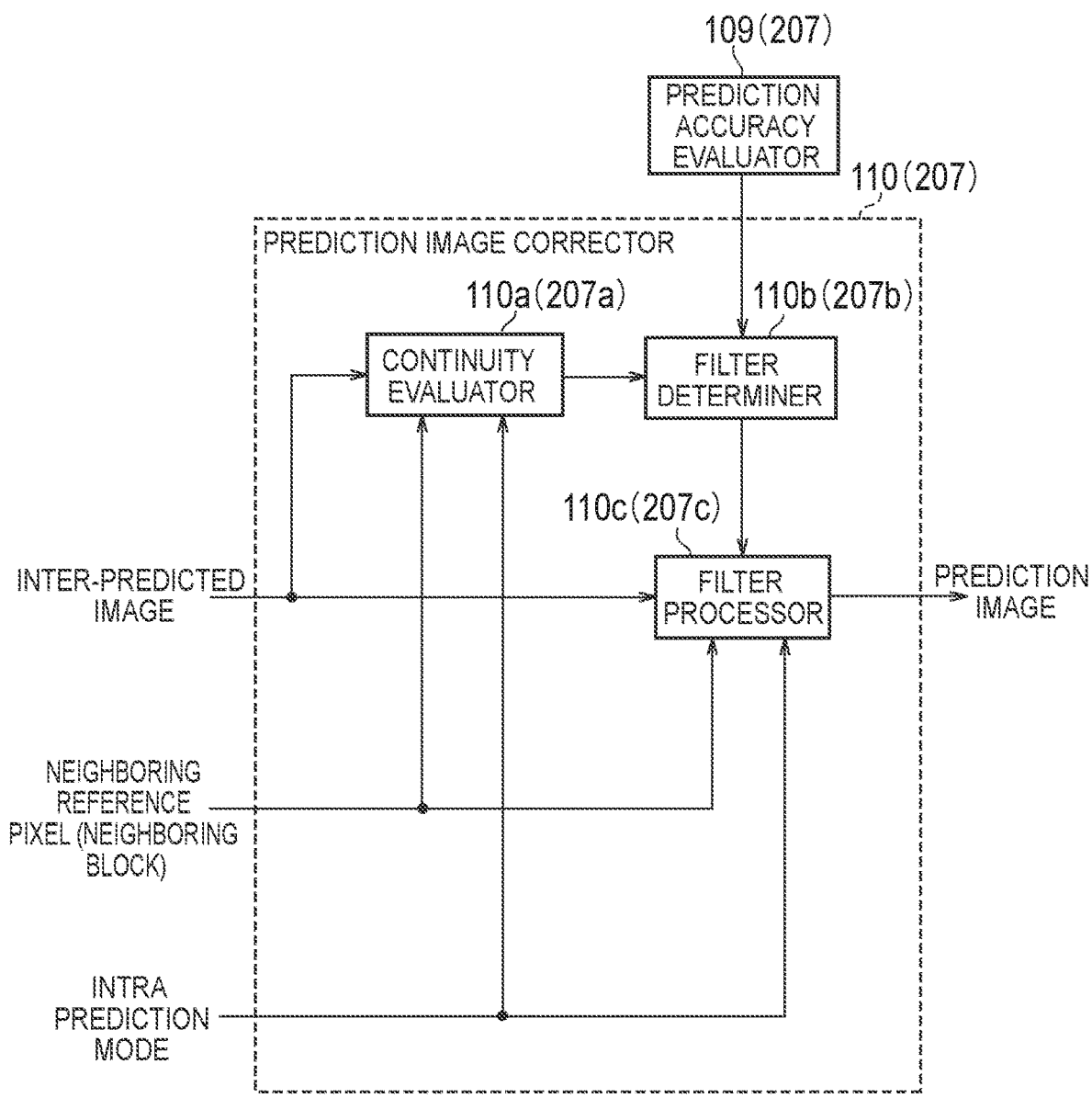
FIG. 9 is a diagram illustrating an arrangement of a prediction image corrector according to a modification of the embodiment.

In the continuity evaluation and the filter processing in the above-described embodiment, the intra prediction mode (intra prediction direction) applied to the decoded neighboring block may be taken into consideration. This can improve the accuracy of the continuity evaluation and the filter processing. FIG. 9 is a diagram illustrating an arrangement of a prediction image corrector 110 according to the present modification. As illustrated in FIG. 9, the intra prediction mode applied to the decoded neighboring block is input to the continuity evaluator 110*a* and the filter processor 110*c* from the intra predictor 107. The continuity evaluator 110*a* performs continuity evaluation according to the intra prediction mode applied to the decoded neighboring block. The filter processor 110*c* performs filter processing according to the intra prediction mode applied to the decoded neighboring block.

Figure 10:
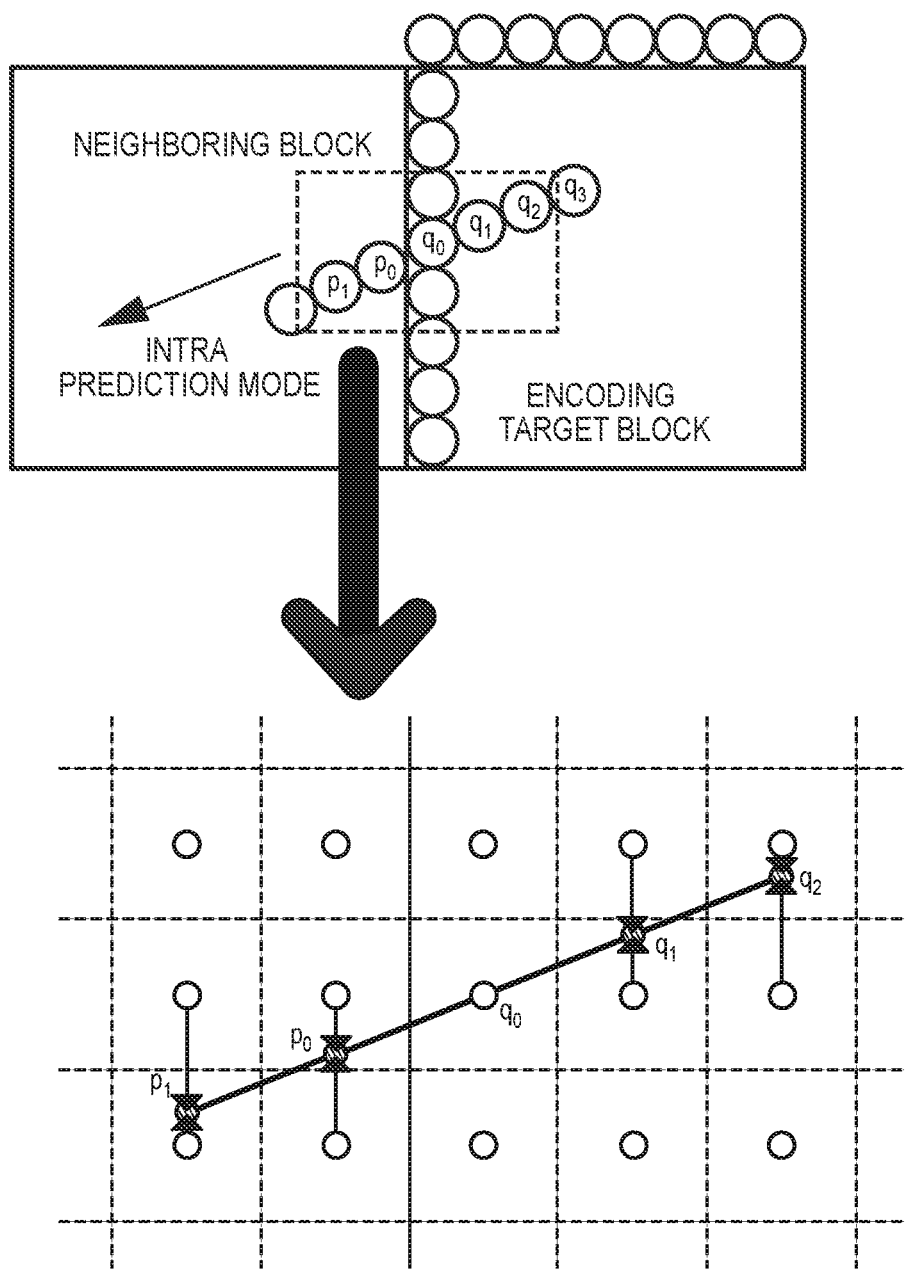
FIG. 10 is a diagram illustrating an example operation of a continuity evaluator and a filter processor according to the modification of the embodiment.

FIG. 10 is a diagram illustrating an example operation of the continuity evaluator 110*a* and the filter processor 110*c* according to the present modification. As illustrated in FIG. 10, when performing continuity evaluation and filter processing on an edge pixel q0 of the inter-predicted image corresponding to the encoding target block, the continuity evaluator 110*a* and the filter processor 110*c* calculate p1, p0, q1, and q2 on a straight line passing through q0 by weighted averaging along the intra prediction mode (intra prediction direction) applied to the decoded neighboring block. Specifically, p1 and p0 on the straight line passing through q0 are calculated by using pixel values in the decoded neighboring block, and q1 and q2 on the straight line passing through q0 are calculated by using pixel values in the inter-predicted image. The continuity evaluator 110*a* evaluates the continuity Cont from the above equation (2) using p1, p0, q1, and q2 calculated in this manner. The filter processor 110*c* calculates co from the above equation (3) using p1, p0, q1, and q2 calculated in this manner.

9. Modification 2 of Embodiment

In the above-described embodiment, an example where the prediction image corrector 110 performs, as correction processing on the inter-predicted image, filter processing on the edge region of the inter-predicted image by using the decoded neighboring block.

Further, the correction processing is not limited to the filter processing, and weighted average processing on the inter-predicted image and the intra-predicted image may be used as the correction processing.

In the present modification, the intra predictor 107 and the prediction image corrector 110 of the image encoding device 1 illustrated in FIG. 1 constitute a corrector that performs correction processing on the inter-predicted image by using the decoded neighboring block adjacent to the target image block.

The intra predictor 107 generates an intra-predicted image corresponding to the target image block by using the decoded neighboring block. For example, the intra predictor 107 generates the intra-predicted image from the decoded neighboring block in a predetermined intra prediction mode. The prediction image corrector 110 performs, as correction processing, weighted average processing on the inter-predicted image input from the inter predictor 108 and the intra-predicted image input from the intra predictor 107. Note that one prediction mode may be selected from a plurality of intra prediction mode candidates to generate the intra-predicted image on the transmission side. In this case, the entropy encoder 103 performs entropy encoding on an intra prediction mode flag indicating which intra prediction mode is used to generate the intra-predicted image on the transmission side.

Similarly, the intra predictor 204 and the prediction image corrector 207 of the image decoding device 2 illustrated in FIG. 2 constitute a corrector that performs correction processing on the inter-predicted image by using the decoded neighboring block adjacent to the target image block. The intra predictor 204 generates an intra-predicted image corresponding to the target image block by using the decoded neighboring block.

For example, the intra predictor 204 generates the intra-predicted image from the decoded neighboring block in a predetermined intra prediction mode. The prediction image corrector 207 performs, as correction processing, weighted average processing on the inter-predicted image input from the inter predictor 205 and the intra-predicted image input from the intra predictor 204. Note that the intra prediction mode used for generating the intra-predicted image may be determined based on an intra prediction mode flag sent from the transmission side.

In the case of applying the arrangement of the present modification, "filter processing" in the above-described embodiment may be read as "weighted average processing". In addition, besides the determination of whether to perform the weighted average processing, the weights for the weighted average processing may be adjusted based on the prediction accuracy evaluation result and the continuity evaluation result.

10. Other Embodiments

In the above-described embodiments, description has been made mainly for the use of bi-prediction as the prediction using a plurality of reference images. However, a technique called intra block copy can also be applied as the prediction using a plurality of reference images. In the intra block copy, a reference image in the same frame as the present frame is used for predicting the target image block in the present frame.

The foregoing may be provided by a program that causes a computer to perform each process performed by the image encoding device 1 and a program that causes the computer to perform each process performed by image decoding device 2. Also, the programs may be recorded in a computer readable medium. The programs can be installed on the computer by using the computer readable medium. Here, the computer readable medium in which the programs are recorded may be a non-transitory recording medium. The non-transitory recording medium is not particularly limited and may be a recording medium such as a CD-ROM or a DVD-ROM, for example. Also, circuits for performing the processes performed by the image encoding device 1 may be integrated to constitute the image encoding device 1 as a semiconductor integrated circuit (chipset, SoC). Similarly, circuits for performing the processes performed by the image decoding device 2 may be integrated to constitute the image decoding device 2 as a semiconductor integrated circuit (chipset, SoC).

The embodiments have been described in detail above with reference to the drawings. Specific configurations are not limited to the above-described configurations, and various design changes, and the like are possible within the scope not deviating from the gist.

The invention claimed is:

1. A prediction image correcting device comprising:
   a predictor configured to predict a block of a target image obtained by dividing an image frame by using a plurality of blocks of reference images to generate a block of a prediction image corresponding to the block of the target image;
   a calculator configured to calculate, for each image portion that is a part of the block and includes a plurality of pixels, sum of absolute differences between the plurality of blocks of reference images used for generating the block of the prediction image; and
   a corrector configured to perform, in the block of the prediction image, a correction processing only on the image portion that the sum of absolute differences exceeds a predetermined threshold, wherein the correction processing is a process of correcting the image portion of the prediction image.

2. The prediction image correcting device according to claim 1, wherein the correction processing is a process of correcting the image portion of the prediction image without correcting motion vectors.

3. The prediction image correcting device according to claim 1, further comprising:
   a combiner configured to output a reconstructed image by adding a prediction residual to the block of the prediction image after the correction processing.

4. The prediction image correcting device according to claim 1, wherein
   the calculator is configured to calculate, for each of a plurality of image portions each of which is a part of the block and includes a plurality of pixels, the sum of absolute differences between the plurality of blocks of reference images used for generating the block of the prediction image; and
   the corrector is configured to perform, among the plurality of image portions of the block of the prediction image, the correction processing only on the image portion that the sum of absolute differences exceeds the predetermined threshold.

5. An image encoding device comprising the prediction image correcting device according to claim 1.

6. An image decoding device comprising the prediction image correcting device according to claim 1.

7. A prediction image correcting method comprising:
   a step of generating a block of a prediction image corresponding to a block of a target image by predicting the block of the target image obtained by dividing an image frame by using a plurality of blocks of reference images;
   a step of calculating, for each image portion that is a part of the block and includes a plurality of pixels, sum of absolute differences between the plurality of blocks of reference images used for generating the block of the prediction image; and
   a step of performing, in the block of the prediction image, a correction processing only on the image portion that the sum of absolute differences exceeds a predetermined threshold, wherein the correction processing is a process of correcting the image portion of the prediction image.

8. The prediction image correcting method according to claim 7, wherein the correction processing is a process of correcting the image portion of the prediction image without correcting motion vectors.

9. The prediction image correcting method according to claim 7, further comprising:
   outputting a reconstructed image by adding a prediction residual to the block of the prediction image after the correction processing.

10. The prediction image correcting method according to claim 7, wherein
    the step of calculating calculates, for each of a plurality of image portions each of which is a part of the block and includes a plurality of pixels, the sum of absolute differences between the plurality of blocks of reference images used for generating the block of the prediction image; and
    the step of performing the correction processing performs, among the plurality of image portions of the block of the prediction image, the correction processing only on the image portion that the sum of absolute differences exceeds the predetermined threshold.

\* \* \* \* \*